United States Patent [19]

Momose et al.

[11] Patent Number: 5,718,835
[45] Date of Patent: Feb. 17, 1998

[54] HEAT STORAGE COMPOSITION

[75] Inventors: Chiaki Momose; Kiyoshi Nakagawara; Yuichi Hayashi, all of Amagasaki, Japan

[73] Assignee: Mitsubishi Cable Industries, Amagasaki, Japan

[21] Appl. No.: 753,380

[22] Filed: Nov. 25, 1996

Related U.S. Application Data

[63] Continuation of Ser. No. 562,303, Nov. 22, 1995, abandoned, which is a continuation of Ser. No. 227,532, Apr. 13, 1994, abandoned, which is a continuation-in-part of Ser. No. 60,797, May 12, 1993, abandoned, which is a continuation of Ser. No. 899,582, Jun. 18, 1992, abandoned, which is a continuation of Ser. No. 563,172, Aug. 6, 1990, abandoned.

[30] Foreign Application Priority Data

| Aug. 4, 1989 | [JP] | Japan | 1-203507 |
| Aug. 4, 1989 | [JP] | Japan | 1-203508 |
| Aug. 4, 1989 | [JP] | Japan | 1-203509 |
| Aug. 4, 1989 | [JP] | Japan | 1-203510 |

[51] Int. Cl.$^6$ .................................................. C09K 5/00
[52] U.S. Cl. ..................... 252/73; 208/21; 106/271; 106/272; 525/240; 524/385
[58] Field of Search ............... 208/21; 106/270–272; 252/71, 72, 73, 79; 524/277, 385; 525/222, 232, 240, 505

[56] References Cited

U.S. PATENT DOCUMENTS

| 4,505,953 | 3/1985 | Chen et al. | 427/212 |
| 4,797,160 | 1/1989 | Salyer | 106/96 |
| 4,832,031 | 5/1989 | Last | 128/402 |

*Primary Examiner*—Margaret Einsmann
*Attorney, Agent, or Firm*—Larson & Taylor

[57] ABSTRACT

A heat storage composition characterized in that the composition is prepared by mixing a heat storage component with a component comprising a thermoplastic elastomer and synthetic or natural rubber in an amount of 0.5 to 30 parts by weight per 100 parts by weight of the heat storage component using mechanical means, the heat storage component comprising at least one of a wax having a main chain of hydrocarbon and at least 0° in melting point and a higher monohydroxy alcohol having a melting point of at least 0°.

5 Claims, No Drawings

HEAT STORAGE COMPOSITION

This is a continuation of application Ser. No. 08/562,303 filed Nov. 22 1995 (now abandoned) which is a continuation of application Ser. No. 08,227,532, (now abandoned) filed Apr. 13, 1994 which is a CIP of Ser. No. 08/076,797 filed on May 12, 1993 (now abandoned) which is a continuation of 07,899, 582 filed Jun. 18, 1992 (now abandoned) which is a continuation of Ser. No. 07/563,172 which was filed Aug. 6, 1990 (now abandoned).

BACKGROUND OF THE INVENTION

1. Field of the Invention

The present invention relates to heat storage materials, and more particularly to novel heat storage materials comprising a large quantity of paraffin as the storage component.

2. Description of the Prior Art

Conventional heat storage materials are based on different principles and include those utilizing the sensible heat of substances, those utilizing latent heat involved in phase changes of substances, and those utilizing the heat of chemical reactions of substances. From the viewpoint of actual use, attention is presently directed to heat storage materials which utilize the phase change latent heat of substances. Such materials have found use in air conditioners and building materials of the heat storage type, heat insulating devices, etc.

As one of the heat storage materials utilizing phase change latent heat, an organic heat storage material is known in which a paraffin is used as the storage component. This material is inexpensive and has therefore attracted attention. With this material, the paraffin stores heat when the phase changes from solid to liquid and releases heat when the phase changes from liquid to solid. Accordingly, the use of paraffin requires some measure for preventing the paraffin from leaking out when becoming liquid. Presently proposed as such measures are, for example, (1) the method of accommodating a paraffin in hollow balls or capsules of organic high polymer, and (2) the method of immersing pellets, sheets or like molded bodies of polyolefin in a bath of molten paraffin to thereby impregnated the molded bodies with the paraffin.

However, these methods have the following problems.

The hollow balls or capsules of the method (1) need to be limited in film thickness and material so as to usable with stabilized mechanical strength. Polypropylene or high-density polyethylene is usually used. When thin, the film gives a large capacity to accommodate paraffin but must be resistant to breakage during a long period of use. Furthermore, hollow balls or capsules are used generally in a large number as packed in a large bag or box, which therefore requires a great space.

In the case of the immersion impregnation method (2), it is known that the polyolefin molded body, for example, can be impregnated by this method with as much as at least 70 wt.% of paraffin. The polyolefin molded body impregnated with paraffin further has the advantage of being free of the problem of the method (1) that the film will break. Nevertheless, the heat storage material prepared by this method has the drawback that the impregnating paraffin gradually migrates to render the surface of the material sticky within a relatively short period of time. If the surface of the storage material is sticky owing to the paraffin, the amount of impregnating paraffin is limited, and the sticky surface soils other articles in the neighborhood, giving rise to various problems.

SUMMARY OF THE INVENTION

An object of the present invention is to provide a heat storage material which contains a large quantity of heat storage component and which is adapted to store a large amount of heat.

Another object of the present invention is to provide a heat storage material containing a large quantity of heat storage component, which nevertheless is less likely to migrate to alleviate the resulting problem of stickiness.

Another object of the present invention is to provide a heat storage material which is highly amenable to molding or shaping and which can be crosslinked or expanded when required.

Still another object of the present invention is to provide a heat storage material which has latent heat in a large amount of at least 125 KJ/kg, preferably at least 150 KJ/kg, in the range of temperatures for use and which will not melt, drip, separate into phases or bleed in the form of a liquid even at temperatures not lower than the maximum crystal transition temperature (Tmax, corresponding to the melting point in many cases of the heat storage material used, is not brittle at temperatures lower than Tmax (i.e., at temperatures at which the heat storage component is solid) and can be made into sheets which are tough and elastic and have suitable flexibility.

The above objects are achieved by using a composition obtained by mechanically agitating a heat storage component and a hydrocarbon rubberlike polymer, the heat storage component comprising a component wax having a CH main chain constructing only carbon and hydrogen atoms (referred to CH main chain) and a melting point of at least 0° and/or a higher monohydroxy alcohol having a melting point of at least 0°. The objects are fulfilled more preferably by further incorporating into the composition a fatty acid ester represented by the general formula $R_1COOR_2$ wherein $R_1$ and $R_2$ are each alkyl, a hydrocarbon wax having a melting point of at least 100° and/or a polyolefin polymer.

In the case of floor heating systems of the heat storage type, this temperature is dependent on the floor structure, the kind and dimensions of the floor material and like design factors, and also on the heat release temperature of the heat storage material and the amount of heat thereof. More specifically, the temperature is influenced by the sensible heat and heat conductivity of the heat insulator under the floor, mortar, floor joists, elongated chloride sheets, carpet, plastic tiles, flooring, tatami or straw matting, and like materials, and the thermal resistance of air. Also the atmospheric temperature comfortable to the human being is usually about 19° to about 23° although varying from person to person. In view of these conditions, it is thought that the preferred heat storage temperature is in the range of 30° to 60°, especially of 35° to 40°.

When the component wax and higher monohydroxy alcohol are mixed together according to the invention, the melting point of the resulting mixture is about 10° to about 20° lower than those of the original materials. Furthermore, the mixture retains a capacity to store at least 150 J/g of heat because the higher monohydroxy alcohol is relatively as great as about 200 J/g in the amount of heat storage. Additionally, when these components are approximate in melting point and if the mixing ratio is within a certain range, a sharp single melting peak (phase transition) and a definite stabilized heat release temperature are obtained. If the ratio is altered slightly, two or three complex melting peaks will result, whereas the amount of heat storage remains almost unchanged, so that the mixture is actually usable. When the difference in melting point between the component wax and the higher monohydroxy alcohol is greater than 15°, two independent separate melting peaks appear, but the mixture is usable.

Even when the heat storage component of the present invention consists only of the component wax or higher monohydroxy alcohol, the component can be effectively prevented from bleeding if used in combination with the hydrocarbon rubberlike polymer, whereas the higher monohydroxy alcohol as used singly is slightly less compatible with the rubberlike polymer than the component wax. However, the intimate mixture of component wax and higher monohydroxy alcohol is highly compatible with the rubberlike polymer because the component wax serves as a kind of compatibilizing agent between the alcohol and the rubberlike polymer. Thus, the mixture of component wax and higher monohydroxy alcohol affords a heat storage material having a suitable temperature and a high heat storage capacity and is further favorable with respect to the migration of the heat storage component. The ratio of the higher monohydroxy alcohol to be mixed with the component wax is preferably up to 70 wt. %, most preferably 30 to 60 wt. %, based on the component wax. With the present invention, therefore, it is highly desirable to use the higher monohydroxy alcohol in combination with the component wax.

When air is to be cooled for air conditioning, cool air is made available using such a heat storage material having a heat storage temperature of 0° to 15°, so that normal paraffin, for example, is favorably used as the heat storage component. In this case, the other storage component is admixed with the paraffin.

The heat storage material, when having a heat storage temperature of about 20°, is also useful for growing plants. Like materials having a storage temperature of 70° are used for other cases.

DETAILED DESCRIPTION OF THE INVENTION

The component wax for use in the heat storage component of the present invention is a wax having a CH main chain and at least 0° in melting point. Examples of useful component waxes having a CH main chain and a melting point of at least 0° are paraffin wax, normal paraffin, wax, microcrystalline wax, normal alpha-olefins having a melting point of lower than 100°, etc. Those having a main chain of other than carbon and hydrogen atoms, e.g., a main chain containing hydroxyl, such as polyethylene glycol, fail to give heat storage materials containing a large quantity of heat storage component and free of the drawback of bleeding. In the present invention, the normal paraffin having at least 12 carbon atoms, more preferably 14 to 18 carbon atoms are used preferably. Preferred examples are tetradecane, pentadecane, hexadecane, octadecane, eicosane and the like.

Preferred examples of normal alpha-olefins are hexadecen-1, octadecen-1, eicosene-1 and the like. The higher monohydroxy alcohol to be used in the present invention is a monohydric alcohol usually having at least 12 carbon atoms, preferably having 14 to 20 carbon atoms. Preferred examples are tetradecanol, hexadecanol, octadecanol, eicosanol and the like.

The higher monohydroxy alcohol is used in an amount of 0 to 70 parts by weight, preferably 30 to 60 parts by weight, per 100 parts by weight of the component wax.

One of these ingredients of the heat storage component is used, or at least two of them are used conjointly. The latter case has the great advantage that the heat storage temperature, as well as the heat release temperature, is suitably adjustable by selecting the desired ingredients and optionally determining the ratio therebetween within the above range. The two or more ingredients to be selected are not limited specifically.

In the case of floor heating system, the heat storage component is preferably 30° to 60° in heat storage temperature according to the invention. When the difference in melting point between the component wax and the higher monohydroxy alcohol mixed therewith is not greater than about 10°, the resulting mixture is especially preferable since the melting point of the mixture is about 10° to about 20° lower than those of the ingredients.

A fatty acid ester having a melting point of at least 0° can be further incorporated into the heat storage material of the invention in an amount of 5 to 50 parts by weight, preferably 10 to 20 parts by weight, per 100 parts by weight of the heat storage component. The ester is represented by the general formula

wherein $R_1$ and $R_2$ are each alkyl having 1 to 30 carbon atoms.

The presence of the fatty acid ester readily permits the mixture of component wax and higher monohydroxy alcohol to have a single melting peak, and is especially effective for lowering the melting point. Examples of useful esters are methyl stearate, myristyl myristate and the like.

If the amount of ester present is too small, the melting point will not drop sufficiently, whereas an excess of ester, if present, tends to result in a reduced amount of heat storage.

The hydrocarbon polymer to be used in the present invention is a thermoplastic elastomer or like rubberlike polymer.

The thermoplastic elastomer or like rubberlike polymer is apparently in a solid state since no liquid appears on the surface even when the heat storage component comprising the component wax and/or the higher monohydroxy alcohol is heated to a temperature not lower than the melting point of the component. The amount of rubberlike polymer is preferably 5 to 20 parts by weight per 100 parts by weight of the heat storage component. If the amount of rubberlike polymer is small, the heat storage material is soft and is therefore liable to thermally deform at a temperature not lower than the heat storage temperature even if in the form of a solid. An excess of rubberlike polymer, if present, leads to a relatively smaller amount of heat storage.

Usable as thermoplastic elastomers are those known as "thermoplastic elastomers" in the field of rubbers and plastics. Preferable among these are styrene or olefin elastomers, especially styrene-olefin elastomers in view of compatibility with the mixture of component wax and higher monohydroxy alcohol. Preferable styrene-olefin elastomers are hydrogenated styrene-ethylene-butylene-styrene block copolymer (SEBS) and hydrogenated styrene-isoprene-styrene block copolymer (SEPS).

The styrene content of the styrene-olefin thermoplastic elastomer is preferably at least wt. % of diblock, triblock or like multiblock, and the molecular weight thereof is preferably at least 50,000. More preferably, the styrene content is 10 to 30 wt. %, and the molecular weight is 100,000–200,000. When the molecular weight is great, the elastomer is satisfactory in its properties to incorporate the heat storage component therein and in thermal deformability. Examples of olefin rubbers are ethylene-propylene copolymer (ERR) and ethylene-propylene-diene copolymer (EPDR). Ethylene-vinyl acetate copolymer is also usable. When the elastomer has a structure greatly different from the chemical structure of hydrocarbons, the elastomer fails to confine the heat storage component therein, permitting marked bleeding.

When the composition of the invention (the mixture further comprising the fatty acid ester if the ester is used) further contains a hydrocarbon wax having a melting point of at least 100° and/or a polyolefin polymer having a melting point of at least 100°, the wax and/or the polymer can be admixed in an amount of 1 to 50 parts by weight, preferably 2 to 10 parts by weight, per 100 parts by weight of the composition.

Examples of useful hydrocarbon waxes are polyethylene, polypropylene, etc. Especially preferable are those having a great molecular weight and a high density. The molecular weight is preferably at least 4,000. Examples of useful polyolefin polymers are similarly polyethylene, polypropylene, etc. Preferable from the viewpoint of hardness effect are straight-chain low-density polyethylene, medium-density polyethylene and high-density polyethylene. Also usable is a silane-modified crosslinkable polyethylene. The density is preferably at least 0.93 g/cm$^3$.

The rubberlike polymer, hydrocarbon wax or polyolefin polymer (hereinafter referred to as the "hydrocarbon component") to be used in the present invention can be crosslinked when required. The crosslinking is effected during or after mixing with the heat storage component.

The method of crosslinking can be any of common methods which include chemical crosslinking, silane crosslinking (water crosslinking) and irradiation crosslinking.

The composition can be subjected to chemical crosslinking using a chemical crosslinking agent which is capable of crosslinking the hydrocarbon component used.

Examples of useful chemical crosslinking agents include dicumyl peroxide and like organic peroxide crosslinking agents for stylene-ethylene-butylene-stylene copolymer, stylene-isoplene-stylene copolymer, ethylene-propylene copolymer rubber, ethylene-propylene-diene terpolymer rubber, ethylene-vinyl acetate copolymer rubber and the like, and the polyolefin polymers such as polyethylene. The chemical crosslinking agent is used preferably in an amount of about 0.5 to about 10 parts by weight per 100 parts by weight of the hydrocarbon component.

When organic peroxides are used as crosslinking agents, it is possible to use, triallyle isocyanate, acrylic ester compounds and the like as auxiliary crosslinking agents.

In the case where the sulfur crosslinking agent is used for the chemical crosslinking, a crosslinking accelerator is usable when so required. Examples of useful crosslinking accelerators are diphenylguanidine and like guanidine accelerators, 2-mercaptobenzothiazole and like thiazole accelerators, and tetramethylthiuram disulfide and like thiuram accelerators. Also usable are aldehyde-amine compounds, aldehyde-ammonia compounds, dithiocarbamate compounds and the like which are usually used as vulcanization accelerators for rubbers. Further usable are zinc oxide and like metal oxides and triethanolamine and like amines. When oximes are used as crosslinking agents, it is desirable to use lead oxide as an auxiliary agent besides sulfur and the above-mentioned vulcanization accelerators.

These auxiliary crosslinking agents are used in an amount suitable for giving the desired degree of crosslinking, i.e., in an amount usually of about 0 to about 10 parts by weight per 100 parts by weight of the hydrocarbon component.

With use of any of the crosslinking agent, the chemical crosslinking is effected by heating the composition at the same temperature for the same period of time as is usually the case with the crosslinking of rubbers and plastics. Accordingly, the composition is heated usually at 100° to 250° for several minutes to several hours.

For silane crosslinking, hydrolyzable silane compounds and organic peroxides are used.

The silane compound to be used is a compound represented by the formula RR'SiY$_2$ wherein R is a monovalent olefinically unsaturated hydrocarbon group or hydrocarbonoxy group, Y is a hydrolyzable organic group, and R' is the group R or group Y. Examples of such silane compounds are vinyltrimethoxysilane, vinyltriethoxysilane, vinylmethyldimethoxysilane and the like. The silane compound is used generally in an amount of 0.05 to 10 parts by weight, especially 0.5 to 5 parts by weight, per 100 parts by weight of the hydrocarbon component. The silane compound is grafted to the hydrocarbon component by the action of the organic peroxide to be described below and acts to form a crosslinking point between the molecules of the organic high polymer with water.

The organic peroxide to be used is a compound capable of causing the component to produce a free radical at a temperature not lower than the decomposition temperature of the peroxide, especially not lower than 100°. Examples of such peroxides are dicumyl peroxide, 2,5-dimethyl-2,5-di (tert-butylperoxy)-hexyne- 3 and the like. The organic peroxide is used generally in an amount of 0.005 to 2 parts by weight, especially 0.05 to 0.5 part by weight, per 100 parts by weight of the component.

For silane crosslinking, it is also possible to use a condensation catalyst for the silane compound when required. Useful condensation catalysts are those generally known as silanol condensation catalysts, such as dibutyltin dilaurate, stannous acetate, lead naphthenate, zinc caprylate and like salts of carboxylic acids, titanic acid esters, chelate compounds and like organic metal compounds, etc. The condensation catalyst is used in an amount of up to about 0.1 part by weight per 100 parts by weight of the component and has an effect to accelerate the crosslinking reaction with water.

In silane crosslinking, it is necessary to graft the silane compound onto the hydrocarbon component prior to the crosslinking. The grafting process is practiced in the following manner.

First, a component wax, the other components to be used, desired additives, silane compound, organic peroxide and the like are premixed together in specified amounts, using two rolls or like usual mixer or by stirring. Since the silane compound is readily vaporizable, it is desirable to add this compound in a closed space, or to directly mix the compound with the other ingredients in an extruder or like closed mixer in the subsequent step.

The premixed composition is then fully agitated for at least 30 seconds in the closed mixer which is maintained at a temperature not lower than the decomposition temperature of the organic peroxide, preferably not lower than 140°. In this step, the organic peroxide causes the hydrocarbon component to produce a radical to graft the silane compound thereto. The hydrocarbon component is made crosslinkable with water and uniformly mixed with the paraffin, whereby a uniform composition is obtained which can be crosslinked with water. Usable as the closed mixer in this step is a usual one, such as an extruder or two-screw kneader-extruder. The uniform composition thus obtained, or the article prepared by molding the composition into the desired shape can be crosslinked in the presence of a very small amount of water, such as the water contained in the composition or article, or the water in the air, as is the case with usual organic high polymers which can be crosslinked with water, so that there is no need to follow any particular crosslinking procedure. When required, however, accelerated crosslinking may be effected, for example, by immersing the composition or the article in hot water.

For irradiation crosslinking, an auxiliary crosslinking agent is used when required. The auxiliary cross linking agent to be used is any of those generally used, such as triallyl isocyanate, triallyl cyanate, trimethylolpropane, trimethacrylate, diallyl isophthalate and the like. The auxiliary agent is used in an amount of 0.05 to 10 parts by weight, especially 0.5 to 5 parts by weight, per 100 parts by weight of the hydrocarbon component, generally after the composition has been molded into a heat storage material of the invention, or before or during molding if possible, the composition is irradiated with rediation, electron rays or the like at a dose of about 5 to about 30 Mrad for crosslinking.

When the storage material of the present invention is to be crosslinked by any method, the degree of crosslinking is at least 1wt. %, preferably at least 2 wt. % in terms of gel fraction ratio as measured according to JIS C 3005. When crosslinked to at least 1%, preferably to at least 2%, the material is capable of retaining its shape without melting or dripping even if subjected to temperatures not lower than Tmax of the paraffin used.

In the case where the heat storage material of the present invention is heated at a relatively high temperature as when it is used for floor heating systems of the heat storage type, it is desirable for actual use that the storage material have a dropping point of at least 80°, preferably at least 100°, as measured according to JIS K 2220, "Dropping Point Test Method." Although the hydrocarbon rubberlike polymer raises the dropping point of the present heat storage material, the hydrocarbon wax or polyolefin polymer also raises the dropping point. When required, the dropping point of the present storage material can be raised by adding a dropping point improving agent. Such improving agents to be used preferably are those capable of raising the dropping point of the composition comprising the heat storage component and hydrocarbon components by at least 5°, more preferably by 10°. In other words, useful dropping point improving agents are those having a melting point or softening point of at least 80°, preferably at least 100°. From the viewpoint of the kneadability of the components to be made into the storage material of the present invention, it is desirable to use dropping point improving agents which are below 200°, preferably below 150°, in melting point or softening point.

Examples of such dropping point improving agents are magnesium stearate, aluminum stearate, calcium stearate and the like, i.e., metal soaps of a fatty acid and a metal such as Li, Mg, Al, Ca, Ba, Zn, Cd or Pd which have a molecular weight of 800 to 6000; methylenebis stearamide, ethylenebis oleylamide, ethylenebis stearamide and like fatty acid amides (amide waxes); silica, clay and like inorganic fillers; polyurea and like reactive dropping point improving agents; etc. These improving agents are used in an amount of about 1 to about 10 parts by weight per 100 parts by weight of the composition of the heat storage component and the hydrocarbon components.

According to the present invention, the heat storage component, hydrocarbon rubberlike component and other components are mixed together by mechanical means to obtain a uniform composition.

The expressing "mixing by mechanical means" means agitating, mixing or kneading of the heat storage component and various hydrocarbon components in a state in which the components are made flowable and deformable under the action of an external force by being subjected to a high temperature or by causing the melt of at least one of these components at least to swell the other components therewith or preferably to dissolve the other components therein.

The composition is prepared, for example, by dissolving the hydrocarbon components in the heat storage component as maintained at 100° to 200°, preferably at 120° to 130°, in a molten state, and agitating and mixing the resulting solution having a high temperature, or by kneading and mixing the components with two rolls, Banbury mixer, extruder, two-screw kneader-extruder or like usual kneader-mixer at a temperature, e.g., of 40° to 200°, at which the components soften. Although it is desirable to mix the components thoroughly to the greatest possible extent, the objects of the present invention can be fulfilled by mixing them generally for about 1 to about 150 minutes to such an extent that the components are bound to have been uniformly mixed together with the unaided eye.

It is desired that the present heat storage material have sufficient mechanical strength generally when in shape for use. Satisfactory mechanical strength makes it easy for the storage material to receive energy from outside for storage and to retain the initial shape at a high temperature resulting from the storage, and is also advantageous when the storage material is used as a building material. In the case where the storage material is to be used for floor heating systems of the heat storage type utilizing midnight electric power, the storage material, if having high mechanical strength, is serviceable free of problems such as deformation due to gravity and can be installed efficiently in a limited space in a desired shape or arrangement.

For this purpose, improved mechanical strength can be imparted to the present heat storage material with use of reinforcing materials when so required. Examples of useful reinforcing materials are inorganic fibers or wires such as glass fiber, ceramic fiber, rock wool, carbon fiber, metal fibers and metal wires; synthetic or natural fibers such as polyamide, polyester, phenolic resin, hemp, cotton, pulp and jute fibers; etc. These fibers are, for example, about 1 to about 1000 µm in outside diameter, and are cut to short lengths of about 10 to about 1000 in terms of aspect ratio (ratio of length to outside diameter) and mixed with the composition. Alternatively, they are used in the form of strings, wires, nonwoven fabric, usual fabric, netting or the like. In the case where the heat storage material of the invention is a plate or sheet, it is generally desirable to use a fabric, nonwoven fabric or netting of reinforcing material in the form of at least one layer as incorporated in the heat storage material. When the present heat storage material is a thin or thick elongated body, it is desirable to use a string, wire or the like of reinforcing material as incorporated in the body concentrically therewith. When the heat storage material of the invention is in the form of a plate, it is desirable to reinforce the plate by providing metal netting on one surface, preferably on each surface, of the plate. The composition constituting the heat storage material of the invention has high moldability and can therefore be molded, with or without crosslinking, into sheets, rods, honeycombs or tubes, or in any of various other forms. The presence of the fibrous reinforcing material as cut to short lengths is generally effective for the present storage material prepared in any shape, while it is also desirable to use strings, wires, fabric, nonwoven fabric or netting of reinforcing material in combination with the fibrous material.

The heat storage composition of the invention prepared is molded as it is or as slightly cooled. The composition may be molded into sheets or plates as desired by being poured into molds. Since the present composition solidifies at a temperature below the melting point of the heat storage component used, the composition is alternatively made into blocks, then pelletized and thereafter molded to the desired shape using a usual molding machine such as press molding machine, extruder or injection molding machine. The composition may be applied to a film, cloth, synthetic fiber, metal fiber, cushion sheet or blocklike sheet of such material, or the like as by adhesion coating or impregnation to obtain a sheet or plate. The composition can be packed into a bag of alminum laminate, lead laminate or the like and made into a sheet or plate during the subsequent cooling step.

It is recommended to use the present heat storage material as expanded if a long period of time needed to store heat will not pose any substantial problem and when it is rather required to use the storage material with moderate release of heat over a prolonged period of time. The heat storage material is expanded while or after the material is molded. For example, the material may be expanded during the step of extrusion, press molding or injection molding, or the material as molded can be expanded by heating.

The material may be expanded by any desired method, for example, by a chemical method using a decomposable blowing agent such as sodium bicarbonate, N,N'-dinitrosopentamethylenetetramine, azodicarbonamide, azobisisobutyronitrile, P,P'-oxybisbenzenesulfonyl hydrazide or toluenesulfonyl hydrazide, by a physical method using an expandable blowing agent such as a non-Freon gas, air, nitrogen, carbon dioxide or water, or by incorporating hollow glass beads, plastic beads or the like into the material. Although there is no particular need to effect uniform expansion, it is also desirable to expand the material uniformly using a known nucleating agent in combination with the blowing agent.

Although the degree of expansion (the ratio in percentage of the void portion in the expanded material in volume) of the heat storage material is variable with the contemplated use of the storage material, a considerable effect to delay the release of heat can be achieved even by a low degree of expansion of about 5%. Generally, it is suitable that the degree of expansion be about 10 to about 90%.

To obtain a satisfactory expanded molded product, it is generally desirable to crosslink the heat storage composition. The composition can be crosslinked by any of the aforementioned methods, such as chemical crosslinking, silane crosslinking and irradiation crosslinking, before, during or after the molding step or expansion step. Regardless of the method used of crosslinking the storage material, the degree of crosslinking (apparent gel fraction ratio of the whole composition) as determined according to JIS C 3005 is preferably at least 1 wt. %, more preferably at least 2 wt. %. When crosslinked to at least 1 wt. % or preferably to at least 2 wt. %, the heat storage material will not melt or drip but retains it shape even when subjected to a temperature not lower than melting point of the heat storage component used.

While the heat storage material of the present invention is usable, as a rule, in any of the states or modes in which conventional heat storage materials of the same type are used, it is especially desirable to prepare the storage material in the form of a sheet, cover the sheet with a protective film, for example, of polyethylene, polypropylene, polyester or the like, and further provide an isothermal layer of aluminum or like metal foil over the protective cover. The sheet may be covered with a laminate of such a film and aluminum or like metal foil.

In addition to the foregoing components, various additives can be incorporated into the composition of the present invention. These additives include, for example, aging preventing agent, antioxidant, coloring agent, pigment and antistatic agent; fungiproof agent, flame retardant and rodent repellent which may be used for some uses; and finely divided metals, metal fibers, metal oxides, carbon and carbon fiber for giving an improved heat transfer effect.

EXAMPLES

The present invention will be described in greater detail with reference to the following examples and comparative examples, in which the parts and percentages are all by weight unless otherwise specified.

Examples 1-8 and Comparative Examples 1 and 2

Heat storage materials were prepared in the following manner using the specified components given in Table 1 below.

Each of the storage materials was prepared by melting a heat storage component comprising component wax and a higher monohydroxy alcohol in a container at 130°, thereafter placing a thermoplastic rubberlike polymer of the hydrocarbon type, hydrocarbon wax and olefin polymer into the container, and mechanically mixing these components together, for example, by a bladed agitator to obtain a uniform composition. Subsequently, the heat storage material was molded to a predetermined shape and allowed to stand at room temperature.

The heat storage materials thus prepared were checked for properties by the following measuring methods. Table 1 also shows the results. The components listed in Table 1 are as follows.

Measuring Methods Heat storage temperature

The solidifying peak temperature and melting peak temperature of the material as measured according to JIS K 7121 (method of measuring transition temperatures of plastics) by a differential scanning colorimeter (DSC) were taken to define the range of heat storage temperatures, and the arithmetic mean of the measurements was eventually taken as the heat storage temperature. Amount of heat storage The amount of solidification peak heat and amount of melting peak heat as measured according to JIS K 7122 (method of measuring transition temperatures of plastics) by DSC were taken to define the range of amounts of heat storage, and the arithmetic mean of the measurements was eventually taken as the amount of heat storage.

Shape retentivity

A small piece of test sample of 10 mm square was heated at 60° in a constant-temperature oven for 24 hours and thereafter checked for changes with the unaided eye. When retaining the original shape generally, the sample was evaluated as "good." If deforming on melting, the sample was evaluated as "poor."

Bleeding

A sample treated in the same manner as in the shape retentivity test and withdrawn from the oven was checked with the unaided eye immediately thereafter. The sample was evaluated as "poor" if a marked exudate of heat storage component was found over the surface or around the sample as a downflow.

Components listed in Table 1

*1 Sunwax P-116 (Sun Co.; m.p. 45°)
*2 No. 1 soft paraffin (Nippon Oil Co., Ltd., m.p. 47°, oil content 1.4%)
*3 115° F. paraffin (Nippon Oil Co., Ltd., m.p. 47°, oil content 0.5%).
*4 125° F. paraffin (Nippon Oil Co., Ltd., m.p. 52°)
*5 KALCOHL 40 (Kao Co., Ltd., m.p. 36°)
*6 KALCOHL 60 (Kao Co., Ltd., m.p. 47°)
*7 KALCOHL 80 (Kao Co., Ltd., m.p. 56°)
*8 Product of Kao Co. Ltd.
*9 EXCEPARL MS (Kao Co., Ltd., m. p. 31°)
*10 CEPTON 4033 (Kuraray. Co. Ltd.)
*11 KRATON G1650 (Shell Co. Ltd.)
*12 HIGH WAX 400P (Mitsui-Petrochemical Industries, Ltd., softening point 132°, density 0.97 g/c.c. molecular weight 4,000)
*13 NONFLEX RD (Seiko Kagaku Co. Ltd.)

Examples 9–15 and Comparative Examples 3 and 4

Heat storage materials were prepared in the same manner using the specified components given in Table 2 below.

The heat storage materials thus prepared were checked for properties by the same measuring methods as in Table 1. Table 2 also shows the result.

Components listed in Table 2

*14 NOPALET CN1400 (CHUGOKU SEIYU Co. Ltd., 95% purity)
*15 NOPALET CN1500 (CHUGOKU SEIYU Co. Ltd., 99% purity)
*16 NOPALET CN1600 (CHUGOKU SEIYU Co. Ltd., 95% purity)
*17 NOPALET CN2000 (CHUGOKU SEIYU Co. Ltd., 95% purity)
*18 155° F. paraffin wax (Nippon Oil Co., Ltd., m.p. 70°)

TABLE 1

| | | Example | | | | | | | | Comp. Ex. | |
| | | 1 | 2 | 3 | 4 | 5 | 6 | 7 | 8 | 1 | 2 |
| --- | --- | --- | --- | --- | --- | --- | --- | --- | --- | --- | --- |
| Paraffin wax (A) | *1 | — | 50 | 70 | — | — | — | — | — | — | — |
| Paraffin wax (B) | *2 | 40 | — | — | 60 | — | — | — | — | 100 | — |
| 115° F. paraffin wax | *3 | — | — | — | — | 45 | 60 | — | 100 | — | — |
| 125° F. paraffin wax | *4 | — | — | — | — | — | — | 60 | — | — | 100 |
| Tetradecanol | *5 | 60 | — | — | — | — | — | — | — | — | — |
| Hexadecanol | *6 | — | 40 | 30 | 40 | 45 | 40 | — | — | — | — |
| Octadecanol | *7 | — | — | — | — | — | — | 40 | — | — | — |
| Methyl palmitate | *8 | — | — | — | — | 10 | — | — | — | — | — |
| Methyl stearate | *9 | — | 10 | — | — | — | — | — | — | — | — |
| Polymer-SEPS | *10 | 15 | 15 | 15 | 15 | 15 | — | 15 | — | — | — |
| Polymer-SEBS | *11 | — | — | — | — | — | 15 | — | 15 | — | — |
| Polyethylene wax | *12 | 4 | 4 | 4 | 4 | 4 | 4 | 4 | 4 | — | — |
| Antioxidant | *13 | 0.2 | 0.2 | 0.2 | 0.2 | 0.2 | 0.2 | 0.2 | 0.2 | 0.2 | 0.2 |
| Heat storage temp. °C. | | | | | | | | | | | |
| Solidifying-Melting point | | 30–36 | 34–40 | 36–42 | 38–44 | 38–44 | 39–43 | 44–50 | 44–50 | 44–50 | 34–40 |
| Mean | | 33 | 37 | 39 | 41 | 41 | 41 | 48 | 47 | 47 | 37 |
| Amount of heat storage J/g | | 185 | 175 | 180 | 165 | 170 | 180 | 170 | 175 | 160 | 200 |
| Shape retensitivity | | good | good | good | good | good | good | good | good | poor | good |
| Bleeding | | good | good | good | good | good | good | good | good | poor | poor |

TABLE 2

|  |  | Example |  |  |  |  |  |  | Comp. Ex. |  |
|---|---|---|---|---|---|---|---|---|---|---|
|  |  | 9 | 10 | 11 | 12 | 13 | 14 | 15 | 3 | 4 |
| Tetradecane | *14 | 100 | 25 | — | — | — | — | — | — | — |
| Pentadecane | *15 | — | — | — | 100 | 80 | — | — | 100 | — |
| Hexadecane | *16 | — | 75 | 100 | — | 20 | — | — | — | — |
| Eicosan | *17 | — | — | — | — | — | 20 | — | — | — |
| 115° F. Paraffin wax | *3 | — | — | — | — | — | 80 | — | — | — |
| 155° F. Paraffin wax | *18 | — | — | — | — | — | — | 100 | — | 100 |
| Polymer SEBS | *11 | 15 | 15 | 15 | 15 | 15 | 15 | 15 | — | — |
| Polyethylene wax | *12 | 5 | 10 | 10 | 10 | 10 | 5 | 5 | — | — |
| Antioxidant | *13 | 0.2 | 0.2 | 0.2 | 0.2 | 0.2 | 0.2 | 0.2 | 0.2 | 0.2 |
| Heat storage temp. °C. |  |  |  |  |  |  |  |  |  |  |
| Solidifying-Melting point |  | 1–6 | 4–10 | 15–21 | 6–12 | 6–12 | 41–47 | 64–70 | 6–12 | 64–70 |
| Mean |  | 3 | 7 | 18 | 9 | 9 | 44 | 67 | 9 | 67 |
| Amount of heat storage J/g |  | 172 | 138 | 167 | 134 | 134 | 142 | 188 | 167 | 225 |
| Shape retensitivity |  | good | good | good | good | good | good | good | poor | poor |
| Bleeding |  | good | good | good | good | good | good | good | poor | poor |

Comparative Example 5

One hundred parts of high-density polyethylene (0.945 in density, 0.4 in MI), 2 parts of vinyltriemthoxysilane and 0.09 part of dicumyl peroxide were premixed together in a closed container. The mixture was fed to an extruder (28 in L/D, 30 mm in cylinder diameter) adjusted to a cylinder temperature of 200° and extruded at a screw speed of 60 r.p.m. to obtain silane-grafted polyethylene, which was then made into pellets, about 3 mm in size. The pelletized polyethylene was thereafter immersed in water at 70° for 24 hours for crosslinking to obtain crosslinked polyethylene pellets (62% in gel fraction ratio). The pellets were immersed for 5 hours in a bath of paraffin (135° F. paraffin) having a melting point of 58° and maintained at a temperature of 140° to cause the paraffin to penetrate into and impregnate the pellets. The pellets were then withdrawn from the bath, and the paraffin adhering to the surfaces of pellets was immediately dissolved and removed with petroleum benzine to obtain dry paraffin-impregnated crosslinked polyethylene pellets. The pellets had a paraffin content of 79.3% (26 parts of crosslinked polyethylene per 100 parts of paraffin), hence full impregnation. However, when tested for exudation by the following method, the impregnated polyethylene was evaluated as "poor" due to paraffin exudate.

Exudation Test

A sample is maintained at 25° for 60 minutes, then heated to a temperature 20° higher than the melting point of the paraffin over a period of 30 minutes, maintained at the same temperature for 60 minutes, and thereafter cooled to 25° again over a period of 60 minutes. This heat cycle is repeated four times. When the sample is heated fourth time, the surface thereof is checked for exudation of the paraffin. When found to be free from any exudate and dry, the sample is evaluated as "excellent." If slight exudation of paraffin is found to make the surface somewhat sticky, but when the sample can be generally regarded as dry, the sample is evaluated as "good." If the surface is found to be wet owing to the exudation of paraffin, the sample is evaluated as "poor."

Comparative Example 6

Pellets (about 3 mm in mean size) of ethylenevinyl acetate copolymer (25% in vinyl acetate content, 3 in MI) were immersed for 24 hours in a bath of paraffin (115° F. paraffin) having a melting point of 47° and maintained at a temperature of 60° to cause the paraffin to penetrate into and impregnate the pellets. The pellets were then withdrawn from the bath, and the paraffin adhering to the surfaces of the pellets was immediately dissolved and removed with petroleum benzine to obtain dry paraffin-impregnated ethylene-vinyl acetate copolymer pellets. The pellets had a paraffin content of 56.5% (77 parts of ethylene-vinyl acetate copolymer per 100 parts of paraffin), hence insufficient impregnation. The pelletized copolymer was found to be poor by the exudation test to be described below.

Example 16

The same paraffin (100 parts) and 25 parts of the same ethylene-vinyl acetate copolymer as used in Comparative Example 6 were placed into a mixing container maintained at 130° and thoroughly agitated and mixed together into a uniform composition, which was then poured into a mold to obtain an energy storage material in the form of a plate and 3 mm in thickness. The storage material was found to be excellent by the exudation test.

Examples 17–27, Comparative Example 7

To prepare each of the compositions listed in Tables 3 to 5 (the proportions listed are each in the number of parts, the same as in the tables to follow), a hot bath of a paraffin, such as paraffin, micro-crystalline wax or stearic acid, was prepared which had a temperature of 130° to 180°. A hydrocarbon organic high polymer and other ingredient were placed into the bath and mixed therewith by stirring for about 60 to 120 minutes to obtain a uniform molten composition. The molten composition obtained was then poured into a molded and colled in the air to prepare a plate measuring 130 mm×110 mm×2 mm. Each of the platelike storage materials prepared in the respective examples was checked for the properties listed in Tables 1 to 3 by the following methods.

Maximum heat storage temperature

The storage material of the present invention exhibits heat storage characteristics reflecting the crystal transition temperature characteristics of the paraffin used. The maximum heat storage temperature means a temperature at which the material stores or absorbs heat most greatly and which is in coincidence with or approximate to Tmax or melting point of the paraffin in many cases. This temperature is measured by a DSC device according to JIS K 712°.

Shape retentivity

Five 10-mm-square pieces are cut out from the 2-mm-thick plate and superposed one over another to a height of 10 mm (into a 10-mm cube) to obtain a test sample. The sample is heated in an oven maintained at the temperature indicated for 120 minutes and thereafter checked for changes with the unaided eye. When retaining the original shape generally, the sample is evaluated as "good." If deforming or melting, the sample is evaluated as "poor."

Exudation

The storage material is enclosed in a bag of polyethylene film, then allowed to stand at a temperature 20° higher than the maximum heat storage temperature for 24 hours and thereafter checked for the separation of paraffin with the unaided eye. When almost free of changes, the material is evaluated as "good." If apparent separation is found, the material is evaluated as "poor."

TABLE 3

|  |  | Ex. 17 | Ex. 18 | Ex. 19 | Ex. 20 | Comp. Ex. 7 |
|---|---|---|---|---|---|---|
| Composition |  |  |  |  |  |  |
| Paraffin | *1 | 100 | 100 | — | 100 | — |
| Microcrystalline wax | *2 | — | — | 100 | — | 100 |
| Stearic acid |  | — | — | — | — | — |
| Styrene thermoplastic elastomer | *3 | 20 | 10 | 25 | — | 3 |
| Olefin thermoplastic elastomer | *4 | — | — | — | 20 | — |
| Antioxidant | *5 | 1 | — | — | 1 | — |
| Characteristics |  |  |  |  |  |  |
| Maximum heat storage temperature (°C.) |  | 47 | 47 | 67 | 47 | 67 |
| Amount of heat storage (kcal/kg) |  | 39 | 42 | 39 | 38 | 46 |
| Flexibility (20° C.) |  | Good | Good | Good | Good | Poor |
| Shape retentivity (80° C.) |  | Good | Good | Good | Good | Poor |
| Shape retentivity (100° C.) |  | Good | Good | Good | Good | Poor |
| Exudation |  | Good | Good | Good | Good | — |

Notes to Table 3
*1 115° F. Paraffin.
*2 Brand name: SUN NOC N, product of Ouchi Shinko Chemical Industrial Co., Ltd.
*3 Styrene-ethylenebutylene-styrene block copolymer, brand name: KRATON G1650, product of Shell Chemical.
*4 Brand name: SANTOPRENE 201-64, product of Mitsubishi Monsanto Chemical Co., Ltd.
*5 Brand name: IRGANOX 1010, product of Ciba-Geigy.

TABLE 4

|  |  | Ex. 21 | Ex. 22 | Ex. 23 | Ex. 24 |
|---|---|---|---|---|---|
| Composition |  |  |  |  |  |
| Paraffin | *1 | 100 | — | 100 | 100 |
| Microcrystalline wax | *2 | — | 100 | — | — |
| EPDM | *3 | 15 | 15 | 10 | — |
| Ethylene-vinyl acetate copolymer rubber | *4 | — | — | — | 15 |
| LDPE | *5 | 10 | — | — | — |
| HDPE | *6 | — | 5 | — | — |
| L-LDPE | *7 | — | — | 10 | — |
| EEA | *8 | — | — | — | 15 |
| Antioxidant | *9 | 1 | 1 | 1 | 1 |
| Characteristics |  |  |  |  |  |
| Maximum heat storage temperature (°C.) |  | 47 | 67 | 47 | 47 |

TABLE 4-continued

|  | Ex. 21 | Ex. 22 | Ex. 23 | Ex. 24 |
|---|---|---|---|---|
| Amount of heat storage (kcal/kg) | 38 | 41 | 40 | 36 |
| Flexibility (20° C.) | Good | Good | Good | Good |
| Shape retentivity (80° C.) | Good | Good | Good | Good |
| Exudation | Good | Good | Good | Good |

Notes to Table 4
*1 115° F. paraffin.
*2 Brand name: SUN NOC N, product of Ouchi Shinko Chemical Industrial Co., Ltd.
*3 Brand name: ESPRENE 301, product of Sumitomo Chemical Co., Ltd.
*4 Brand name: LEVAPREN 450, product of Bayer.
*5 Brand name: HE-30, product of Mitsubishi Petrochemical Co., Ltd.
*6 Brand name: HZ5100, product of Mitsui Petrochemical Industries, Ltd.
*7 Brand name: UZ3520L, product of the same.
*8 Brand name: DPDJ8026, product of Nippon Unicar Co., Ltd.
*9 Brand name: IRGANOX 1010, product of Ciba-Geigy.

TABLE 5

|  |  | Ex. 25 | Ex. 26 | Ex. 27 |
|---|---|---|---|---|
| Composition |  |  |  |  |
| Paraffin | *1 | 100 | 100 | 100 |
| EVA-1 | *2 | 20 | — | 5 |
| EB | *3 | — | 25 | — |
| Cl-PE | *4 | — | — | 10 |
| Antioxidant-A | *5 | — | — | 1 |
| Antioxidant-B | *6 | 1 | 1 | — |
| Characteristics |  |  |  |  |
| Maximum heat storage temperature (°C.) |  | 47 | 47 | 67 |
| Amount of heat storage (kcal/kg) |  | 40 | 38 | 41 |
| Flexibility (20° C.) |  | Good | Good | Good |
| Shape retentivity |  | Good | Good | Good |
| Exudation |  | Good | Good | Good |
| Processability |  | Good | Good | Good |

Notes to Table 5
*1 115° F. paraffin.
*2 Ethylene-vinyl acetate copolymer, density: 0.95 g/cm$^3$, MFR: 3 g/10 min, m.p.: 85° C., degree of crystallinity: 18%, VA content: 25%.
*3 Ethylene-butene-1 copolymer, density: 0.88 g/cm$^3$, MFR: 4 g/10 min, m.p. 90° C., degree of crystallinity: 15%, butene-1 content: 5%, olefin content: 100%.
*4 Chlorinated polyethylene, specific gravity: 1.1, MFR: 5 g/10 min (180° C., 21.6 kg), degree of crystallinity: 15%, chlorine centent: 23%.
*5 Polymerized trimethyl dihydroquinoline.
*6 Brand name: IRGANOX 1010, product of Ciba-Geigy.

Examples 28–31

The ingredients given in Table 6 for each of the compositions listed were premixed together in a closed container, then fed to a two-screw kneader-extruder adjusted to a cylinder temperature of 200° and extruded at a screw speed of 40 r.p.m. The resulting mixture was poured into a mold and cooled with water to obtain a storage material in the form of a plate with a thickness of 2 mm. In Example, the paraffin and hydrocarbon polymer were mixed together with a twin roll and made into chips before premixing. In the other examples, the ingredients were weighed out in the proportions listed and thereafter premixed together entirely.

The degree of crosslinking was measured according to JIS C 3005 by extraction at the boiling point of xylene serving as a solvent.

TABLE 6

|  |  | Ex. 28 | Ex. 29 | Ex. 30 | Ex. 31 |
|---|---|---|---|---|---|
| Composition |  |  |  |  |  |
| Paraffin | *1 | 100 | — | 100 | 100 |
| Microcrystalline wax | *2 | — | 100 | — | — |
| Ethylene-propylene copolymer | *3 | 20 | — | — | 10 |
| Ethylene-propylene terpolymer | *4 | — | 15 | — | — |
| Ethylene-vinyl acetate copolymer | *5 | — | — | 20 | — |
| Polyethylene | *6 | — | — | — | — |
| Vinylmethoxysilane |  | 2.4 | — | 1.5 | 3.0 |
| Vinylethoxysilane |  | — | 2.0 | — | — |
| Dicumyl peroxide |  | 0.18 | 0.10 | 0.15 | 0.20 |
| Dibutyltin dilaurate |  | 0.1 | 0.05 | — | 0.1 |
| Antioxidant | *7 | 0.3 | 0.3 | 0.3 | 0.3 |
| Characteristics |  |  |  |  |  |
| Maximum heat storage temperature (°C.) |  | 47 | 67 | 47 | 47 |
| Amount of heat storage (kcal/kg) |  | 39 | 42 | 39 | 39 |
| Flexibility (20° C.) |  | Good | Good | Good | Good |
| Shape retentivity (100° C.) |  | Good | Good | Good | Good |
| Exudation |  | Good | Good | Good | Good |
| Degree of crosslinking (%) |  | 11 | 5 | 9 | 10 |

Notes to Table 6
*1 115° F. paraffin.
*2 Brand name: SUN NOC N, product of Ouchi Shinko Chemical Industrial Co., Ltd.
*3 Brand name: EPO2P, product of Japan Synthetic Rubber Co., Ltd.
*4 Brand name: ESPRENE 301, product of Sumitomo Chemical Co., Ltd.
*5 Brand name: EVA 25K, product of Mitsubishi Petro-Chemical Co., Ltd.
*6 Brand name: UZ3520L, product of Mitsui Petro-Chemical Industries, Ltd.
*7 Polymerized trimethyl dihydroquinoline.

Examples 32–35

The ingredients given in Table 7 for each of the compositions listed were mixed and kneaded together with a twin roll and pressed for crosslinking to obtain a storage material, 130 mm×110 mm×2 mm. This press crosslinking operation was performed at 150° for 30 minutes in Example 32, or 165° for 30 minutes in Examples 33 to 35.

TABLE 7

|  |  | Ex. 32 | Ex. 33 | Ex. 34 | Ex. 35 |
|---|---|---|---|---|---|
| Composition |  |  |  |  |  |
| Paraffin | *1 | 100 | 100 | 100 | — |
| Microcrystalline wax | *2 | — | — | — | 100 |
| Natural rubber | *3 | 20 | — | — | — |
| EPDM | *4 | — | 20 | 10 | 15 |
| Sulfur |  | 0.6 | 0.2 | 0.1 | 0.2 |
| Dicumyl peroxide |  | — | 1.5 | 0.8 | 1.5 |
| Dibenzothiazyl disulfide |  | 0.3 | — | — | — |
| ZnO |  | 2 | 2 | 1 | 2 |
| Antioxidant | *5 | 1 | 1 | 1 | 1 |
| Characteristics |  |  |  |  |  |
| Maximum heat storage temperature (°C.) |  | 47 | 47 | 47 | 66 |
| Amount of heat storage (kcal/kg) |  | 39 | 39 | 41 | 40 |
| Flexibility (20° C.) |  | Good | Good | Good | Good |
| Shape retentivity (80° C.) |  | Good | Good | Good | Good |
| Exudation (80° C.) |  | Good | Good | Good | Good |
| Degree of crosslinking (%) |  | 12 | 10 | 3 | 6 |

Notes to Table 7
*1 115° F. paraffin.
*2 Brand name: SUN NOC N, product of Ouchi Shinko Chemical Industrial Co., Ltd.
*3 SMR-5L.
*4 Brand name: ESPRENE 301.
*5 Polymerized trimethyl dihydroquinoline.

Example 36

The ingredients given in Table 8 for each composition listed were thoroughly mixed together and then molded into a storage material, 5 mm in thickness. For this procedure, the ingredients were fully agitated and mixed together in a container heated at 130 to 180°, and the molten mixture was poured into a mold for molding in Examples 36.

The materials prepared in the examples were tested for the characteristics shown in Table 6 by the foregoing corresponding methods except that the DSC device was used for measuring the maximum heat storage temperature, heat storage temperature range, maximum heat release temperature and heat release temperature range. These characteristics represent the heat storage and heat release characteristics of the storage material reflecting the crystal transition temperature characteristics of the paraffin used. The term "maximum heat storage temperature" refers to a temperature at which the material stores or absorbs heat most greatly. "Heat storage temperature range" includes other temperature, if any besides the maximum heat storage temperature, at which the material also stores heat remarkably, or refers to a temperature range over which the material stores heat. Similarly, heat release characteristics are referred to by like terms, i.e., maximum heat release temperature and heat release temperature range.

TABLE 8

|  |  | Ex. 36 |
|---|---|---|
| Composition |  |  |
| Paraffin A | *1 | 50 |
| Paraffin B | *2 | 50 |
| Paraffin C | *3 | — |
| Stearic acid | *4 | — |
| Polyethylene glycol | *5 | — |
| Thermoplastic elastomer | *6 | 20 |
| Ethylene-vinyl acetate copolymer | *7 | — |
| EPDM |  | — |
| Dicumyl peroxide |  | — |
| Antioxide A | *8 | — |
| Antioxide B | *9 | 0.3 |
| Sulfur |  | — |
| ZnO |  | — |
| Characteristics |  |  |
| Maximum heat storage temperature (°C.) |  | 52 |
| Heat storage temperature range (°C.) |  | — |
| Maximum heat release temperature (°C.) |  | 50 |
| Heat release temperature range (°C.) |  | — |
| Amount of heat storage (kcal/kg) |  | 47 |
| Flexibility |  | Good |

TABLE 8-continued

|  | Ex. 36 |
|---|---|
| Shape retentivity | Good |
| Exudation | Good |

Notes to Table 8
*1 135° F. paraffin.
*2 115° F. paraffin.
*3 Liquid paraffin.
*4 Stearic acid for rubbers.
*5 Brand name: PEG 1540, Product of Nippon Oils & Fats Co., Ltd.
*6 Styrene ethylenebutylene-styrene block copolymer.
*7 (VA: 25%, MFR: 3 g/10 min. degree of crystallinity: 18%)
*8 Polymerized trimethyl dihydroquinoline.
*9 Brand name: IRGANOX 1010, product of Ciba-Geigy.

Examples 37–39

In the same manner as in Example 17, the ingredients given in Table 9 for each composition listed were mixed together and poured into a mold to obtain a storage material, 2 mm in thickness. The waxes marked with *6 to *8 in the same table were used as dropping point improving agents. The dropping point of the storage material was measured according to JIS K 2220, "Dropping Point Test Method, Section 5.4"

TABLE 9

|  |  | Ex. 37 | Ex. 38 | Ex. 39 |
|---|---|---|---|---|
| Composition |  |  |  |  |
| Paraffin | *1 | 100 | 100 | 100 |
| Thermoplastic elastomer | *2 | 15 | — | — |
| Ethylene-vinyl acetate copolymer | *3 | — | 25 | — |
| Polyethylene | *4 | — | — | 5 |
| EPDM | *5 | — | — | 15 |
| Polyethylene wax-1 | *6 | — | 4 | — |
| Polyethylene wax-2 | *7 | 5 | — | — |
| Amide wax | *8 | — | — | 5 |
| Antioxidant | *9 | 0.5 | 0.5 | 0.5 |
| Characteristics |  |  |  |  |
| Maximum heat storage temperature (°C.) |  | 47 | 47 | 47 |
| Amount of heat storage (kcal/kg) |  | 40 | 37 | 39 |
| Flexibility |  | Good | Good | Good |
| Exudation |  | Good | Good | Good |
| Dropping point (°C.) |  | 107 | 101 | 117 |

Notes to Table 9
*1 115° F. paraffin.
*2 Styrene-ethylenebutylene-styrene block copolymer.
*3 VA: 10%, density: 0.94 g/cm$^3$, MFR: 2 g/10 min, degree of crystallinity: 18%.
*4 Density: 0.95 g/cm$^3$, MFR: 0.4 g/10 min, degree of crystallinity: 68%.
*5 Ethylene content: 65%, iodine value: 12.
*6 Molecular weight: 4,000, density: 0.98, softening point: 136° C.
*7 Molecular weight: 2,000, density: 0.97, softening point: 126° C.
*8 Ethylenebis (stearamide)
*9 Brand name: IRGANOX 1010, product of Ciba-Geigy.

Examples 40 and 41

Table 10 shows the compositions used and the characteristics achieved.

In Example 40, the ingredients were kneaded together with full stirring in a container heated at 50° then poured into a mold to form layers between eight pieces of glass cloth and molded into a storage material in the form of a plate, 15 mm in thickness. The material was tested for shape retentivity by the following method.
Shape retentivity A sample of the material, 10 cm×10 cm, is placed on a metal net, heated in an atmosphere with a temperature 20° higher than the maximum heat storage temperature for 120 minutes, and thereafter checked with the unaided eye. When retaining the original shape generally, the material is evaluated as "good." If melting or dripping, the material is evaluated as "poor."

The material was tested for shape retentivity by the following method.
Shape retentivity A strip of the storage material, 20 mm in width and 20 cm in length, is held suspended in an oven at 80° for 120 minutes and then checked for the retentivity of the original shape. The material was evaluated as "good" when free of changes, or as "poor" when drooping markedly.

In Example 41, the ingredients were kneaded and mixed together by a two-screw kneader-extruder maintained at a cylinder temperature of 200°, and made into a storage material in the form of a rod with an outside diameter of 5 mm and having incorporated therein SUS wire having an outside diameter of 1 mm and serving as a reinforcing core. The material was then immersed in hot water for crosslinking and thereafter tested for characteristics. The shape retentivity was evaluated by the following method.
Shape retentivity The storage material is held supported at its opposite ends within an oven at a temperature 20° C. higher than the maximum heat storage temperature for 120 minutes and thereafter checked for deformation or dropping with the unaided eye. The material is evaluated as "good" when almost free of any deformation.

TABLE 10

|  |  | Ex. 40 | Ex. 41 |
|---|---|---|---|
| Composition |  |  |  |
| Paraffin | *1 | 100 | — |
| Microcrystalline wax | *2 | — | 100 |
| Thermoplastic elastomer | *3 | 15 | — |
| Polyethylene | *4 | — | — |
| EPDM | *5 | — | 15 |
| Ethylene-ethyl acrylate copolymer | *6 | — | 10 |
| Dicumyl peroxide |  | — | 0.2 |
| Vinyltrimethoxysilane |  | — | 2.0 |
| Antioxidant | *7 | 1 | 1 |
| Reinforcing material |  | *8 | *9 |
| Characteristics |  |  |  |
| Maximum heat storage temperature (°C.) |  | 47 | 66 |
| Amount of heat storage (kcal/kg) |  | 42 | 38 |
| Degree of crosslinking (%) |  | — | 14 |
| Flexibility |  | Good | Good |
| Shape retentivity |  | Good | Good |
| Exudation |  | Good | Good |

Notes to Table 10
*1 115° F. paraffin.
*2 Brand name: SUN NOC N, product of Ouchi Shinko Chemical Industrial Co. Ltd.
*3 Brand name: KRATON G1650, product of Shell Chemical.
*4 Brand name: HZ 5100, product of Mitsui Petro-Chemical Industries, Ltd.
*5 Brand name: ESPRENE 301, product of Sumitomo Chemical Co., Ltd.
*6 Ethyl acrylate: 15, density: 0.93 g/cm$^3$, MFR: 1.5 g/10 min, m.p.: 100° C.
*7 Brand name: IRGANOX 1010, product of Ciba-Geigy.
*8 Glass cloth
*9 Wire, 1 mm in outside diameter.

Examples 42–44

The ingredients given in Table 11 for each composition were mechanically mixed together into a uniform composition, which was then crosslinked and expanded by the method listed under the conditions specified to obtain a storage material.

In Example 42, the composition was crosslinked, expanded and molded at the same time by press molding. In the case of Examples 43 and 44, the composition was crosslinked after expansion and molding. In each of Examples, the heat release time was measured by the following method.

Heat release time

The storage material, measuring 300 mm×300 mm×20 mm, is enclosed in a bag of 0.1-mm-thick polyethylene sheet. (In Examples 43 and 44, ten superposed 2-mm-thick plates of storage material are used.) The bag is further enclosed with an aluminum laminate composed of three layers of polyethylene, aluminum and polyester (30 μm/25 μm/25 μm) by heat sealing to prepare a heat storage plate.

The plate is heated in an oven at a temperature 10° higher than the maximum heat storage temperature to cause the plate to fully store heat, and thereafter allowed to stand at room temperature (20°) to measure the time taken for the heat storage temperature to drop to a level 20° lower than the maximum heat storage temperature.

TABLE 11

|  |  | Ex. 42 | Ex. 43 | Ex. 44 |
| --- | --- | --- | --- | --- |
| Composition |  |  |  |  |
| Paraffin | *1 | 100 | 100 | 100 |
| EPDM | *2 | 15 | 5 | 20 |
| EVA | *3 | — | — | — |
| EEA | *4 | — | 5 | 20 |
| Sulfur |  | 0.2 | — | — |
| ZnO |  | 2 | — | — |
| Dicumyl peroxide |  | 1.5 | 0.15 | — |
| Vinyltrimethoxysilane |  | — | 2 | — |
| Dibutyltin dilaurate |  | — | 0.05 | — |
| Triallyl isocyanurate |  | — | — | 1.5 |
| Antioxidant A | *5 | 1 | — | — |
| Antioxidant B | *6 | — | 1 | 1 |
| Chemical blowing agent A | *7 | 3 | — | — |
| Chemical blowing agent B | *8 | — | 3 | — |
| Freon gas |  | — | — | (Injected) |
| Crosslinking method |  |  |  |  |
| Chemical crosslinking (°C./min) |  | 165/30 | — | — |
| Silane crosslinking, immersion in hot water (°C./hr) |  | — | 80/24 | — |
| Irradiation crosslinking (Mrad) |  | — | — | 20 |
| Characteristics |  |  |  |  |
| Degree of crosslinking (%) |  | 6 | 4 | 17 |
| Degree of expansion (%) |  | 38 | 15 | 55 |
| Maximum heat storage temperature (°C.) |  | 47 | 47 | 47 |
| Amount of heat storage (kcal/kg) |  | 41 | 43 | 35 |
| Flexibility |  | Good | Good | Good |
| Shape retentivity |  | Good | Good | Good |
| Exudation |  | Good | Good | Good |
| Heat release time (hr) |  | 4 | 3 | 5 |

Notes to Table 11
*1 115° F. paraffin.
*2 Brand name: ESPRENE 301, product of Sumitomo Chemical Co., Ltd.
*3 Brand name: EVA 25K, product of Mitsubishi Petro-Chemical Co., Ltd.
*4 Brand name: DPDG 8026, product of Nippon Unicar Co., Ltd.
*5 Polymerized trimethyl dihydroquinoline.
*6 Brand name: IRGANOX 1010, product of Ciba-Geigy.
*7 P,P'-oxybisbenzenesulfonyl hydrazide.
*8 Azodicarbonamide.

Examples 45–47

The ingredients including a specific gravity adjusting material, such as PbO, ZnO or glass fiber, and listed in Table 12 for each composition were mechanically mixed together uniformly in Example 45 then press-molded, in Example 46 press-molded to crosslink and in Example 47 subjected to water crosslinking in hot water to obtain a heat storage material in the form of pellets (approximately 5-mm cubes).

The storage material thus prepared in each of Examples 45–47 was 1.00 in specific gravity at room temperature and was equal to water in specific gravity. The storage material was placed into a heat storage tank of the direct heat exchange type which was equipped with a stirrer and in which water was used as a heat medium, in an amount corresponding to about one half of the tank capacity. The material was allowed to store heat and release heat repeatedly. Consequently the material repeated satisfactory heat storage-heat release cycles while uniformly moving through the water without remaining locally in the water or blocking.

TABLE 12

|  |  | Ex. 45 | Ex. 46 | Ex. 47 |
| --- | --- | --- | --- | --- |
| Composition |  |  |  |  |
| 135° F. Paraffin |  | 100 | 100 | 100 |
| Thermoplastic elastomer | *1 | 20 | — | — |
| EPDM |  | — | 10 | — |
| Ethylene-vinyl acetate copolymer | *2 | — | 10 | 25 |
| ZnO |  | 14 | 2 | — |
| Sulfur |  | — | 0.2 | — |
| Dicumyl peroxide |  | — | 1.5 | 0.2 |
| Vinyltrimethoxysilane |  | — | — | 2.4 |
| Antioxidant | *3 | 1 | 1 | 1 |
| PbO |  | — | 13 | 14 |
| Glass fiber |  | 3 | — | — |
| Characteristics |  |  |  |  |
| Specific gravity |  | 1.00 | 1.00 | 1.00 |
| Maximum heat storage temperature (°C.) |  | 57 | 57 | 57 |
| Amount of heat storage (kcal/kg) |  | 38 | 38 | 37 |
| Degree of crosslinking (%) |  | — | 10 | 14 |

Notes to Table 12
*1 Styrene-ethylenebutylene-styrene block copolymer.
*2 VA: 25%, density: 0.95 g/cm³ MFR: 3 g/10 min.
*3 Brand name: IRGANOX 1010, product of Ciba-Geigy.

Examples 48 and 49

The ingredients for preparing each of the composition of Example 17 and the composition of Example 42 were mixed together in the same manner as in the example concerned and made into a storage material in the form of a plate and measuring 800 mm×250 mm×20 mm by the same procedure. The material was enclosed in a bag of 0.1-mm-thick polyethylene sheet and further enclosed with an aluminum laminate sheet composed of three layers of polyethylene, aluminum and polyester (30 μm, 25 μm and 25 μm in thickness) by heat sealing. Thus heat storage boards were prepared using the composition of Example 17 in Example 48, and the composition of Example 42 in Example 49.

A 100-V, 67-W heater wire was sandwiched between two storage boards of each of Examples 48 and 49 to prepare and assembly, which was then installed between a floor panel and a heat insulating layer provided therebelow to construct a floor heating unit of the heat storage type. The heater wire in the unit was energized for 8 hours and subsequently held unenergized for 16 hours, and this cycle (24 hours) was repeated to continuously measure the temperature of the floor surface. The test thus conducted in each of the examples revealed that the floor was heated to 28° and thereafter remained at a temperature of 26° to 28° stably even after the lapse of 24 hours.

Example 50

The ingredients for the composition of Example 25 were mixed together in the same manner as in Example 25 and made into a storage material in the form of a plate and measuring 300 mm×350 mm×20 mm. The material was enclosed in a bag of 0.1-mm-thick polyethylene sheet and further enclosed with an aluminum laminate sheet of three layers of polyethylene, aluminum and polyester (30 µm, 25 µm and 25 µm in thickness) by heat sealing. A heat insulating expanded material, about 5 mm in thickness, was placed over both surfaces of the enclosed storage material, and the assembly was placed into a bag to prepare a cushion of the heat storage type. When the cushion was heated in an oven for heat storage and then used as such in an outdoor party, the cushion remained warm and felt comfortable for about 4 hours. The atmospheric temperature was about 10°. When a heater wire is interposed between layers of the storage material to prepare such a cushion, the cushion can be made to store heat with ease by energizing the wire. In this case, the heater wire may be of the 100-V, 30-W to 50-W class.

Advantages of the Invention

The storage material of the present invention has a high level of latent heat of at least 30 kcal/kg, preferably at least 35 kcal/kg, and is greatly improved in respect of melting, dripping, phase separation and bleeding of liquid even at high temperatures close to Tmax or melting point of the paraffin incorporated therein. The material can be prepared in the form of a sheet, which retains suitable flexibility without cracking. Because of these characteristics, the present storage material can be readily placed into use, for example, in floor heating systems of the heat storage type, heat storage tanks, etc., and yet very advantageously assures a long-term operation with safety. The present material is useful also for mats and like household articles and further for heat storage building materials and the like.

What is claimed is:

1. A heat storage composition characterized in that the composition is prepared by mixing a heat storage component with a component comprising a hydrocarbon rubberlike polymer in an amount of 0.5 to 30 parts by weight per 100 parts by weight of the storage component using mechanical means, said heat storage component comprising (i) at least one hydrocarbon wax having a melting point of 0° C. to lower than 100° C. and (ii) a monohydroxy alcohol having at least 12 carbon atoms, said mixture of (i) and (ii) having a capacity to store at least 150 Kj/kg, said hydrocarbon rubberlike polymer being selected from at least one thermoplastic polymer, and said mixing being conducted by using mechanical means with the application of heat to cause melting of at least one of the components in the mixture.

2. A heat storage composition according to claim 1 wherein the monohydroxy alcohol has 12–20 carbon atoms.

3. A heat storage composition as defined in claim 1 wherein the hydrocarbon rubberlike polymer is dissolved into the melt of heat storage component.

4. A heat storage component according to claim 1 which further includes a fatty acid ester having the structure $R_1COOR_2$ wherein $R_1$ and $R_2$ are each alkyl having 1 to 30 carbon atoms, said fatty acid ester having a melting point of at least 0° C. in an amount of 5 to 50 wt% based on the heat storage component.

5. A heat storage composition as defined in claim 1 or 4 further comprising a polyolefin polymer having a melting point or softening point of at least 100° C. in an amount of 2 to 10 parts by weight per 100 parts by weight of the composition.

* * * * *